United States Patent [19]

Tarancon

[11] Patent Number: 4,994,308
[45] Date of Patent: Feb. 19, 1991

[54] DIRECT FLUORINATION OF POLYMERIC MATERIALS BY USING DIOXIFLUORINE FLUID (MIXTURE OF $CO_2$ AND $F_2$)

[75] Inventor: Gregorio Tarancon, Woodbridge, N.J.

[73] Assignee: Tarancon Corporation, Lake City, Ga.

[21] Appl. No.: 200,353

[22] Filed: May 31, 1988

[51] Int. Cl.$^5$ .................. C23C 18/20; C23C 16/00
[52] U.S. Cl. .................. 427/255.1; 427/255.4; 427/377; 427/398.4; 427/400
[58] Field of Search .............. 427/255.4, 255.2, 322, 427/400, 255.3, 255.1, 377, 398.4, 385.5; 264/83

[56] References Cited

U.S. PATENT DOCUMENTS

| | | | |
|---|---|---|---|
| 2,715,075 | 8/1955 | Wolinski | 427/322 |
| 2,801,447 | 8/1957 | Wolinski | 427/322 |
| 2,805,960 | 9/1957 | Wolinski | 427/322 |
| 2,811,468 | 10/1957 | Joffre | 427/255.4 |
| 3,862,284 | 1/1975 | Dixon et al. | 264/83 |
| 3,865,615 | 2/1975 | Manly | 427/255.4 |
| 3,998,180 | 12/1976 | Hawkins et al. | 427/237 |
| 4,296,151 | 10/1981 | Boultinghouse | 427/255.4 |
| 4,330,576 | 5/1982 | Dodd | 427/255.4 |
| 4,382,101 | 5/1983 | Polak | 427/322 |
| 4,384,072 | 5/1983 | Newman et al. | 525/356 |
| 4,486,575 | 12/1984 | Newman et al. | 525/356 |
| 4,501,859 | 2/1985 | Newman et al. | 525/356 |
| 4,513,116 | 4/1985 | Kowalski et al. | 525/53 |
| 4,536,266 | 8/1985 | Bliefert et al. | 204/159.18 |
| 4,548,995 | 10/1985 | Kowalski et al. | 525/354 |
| 4,554,326 | 11/1985 | Kowalski et al. | 525/354 |
| 4,576,837 | 3/1986 | Tarancon et al. | 427/255.4 |
| 4,650,832 | 3/1987 | Kowalski et al. | 525/354 |

FOREIGN PATENT DOCUMENTS

| | | | |
|---|---|---|---|
| 788973 | 7/1968 | Canada | 427/400 |
| 710523 | 6/1954 | United Kingdom | 427/400 |

OTHER PUBLICATIONS

Pinsky et al., "Fluorination of Polyethylene", Modern Packaging, vol. 33, pp. 130–132 and 190, 1960.
Schonhorn et al., "Surface Treatment of Polymers" J. of Applied Polymer Science, vol. 12, pp. 1231–1237, 1968.
Yamazaki et al., "The Controlled Reaction of Hydrocarbon Polymers with Elemental Fluorine", Polymer Letters Edition, vol. 12, pp. 177–184, 1974.

Primary Examiner—Norman Morganstern
Assistant Examiner—Margaret Bueker
Attorney, Agent, or Firm—Ezra Sutton

[57] ABSTRACT

This invention concerns the discovery of a new fluid that promotes the fluorination of polymeric materials more safely, more completely, and more efficiently than the fluids used in the prior art. The new fluid is called "dioxifluorine," which is a mixture of carbon dioxide and fluorine where carbon dioxide is the carrier fluid and fluorine is the reactant.

5 Claims, 1 Drawing Sheet

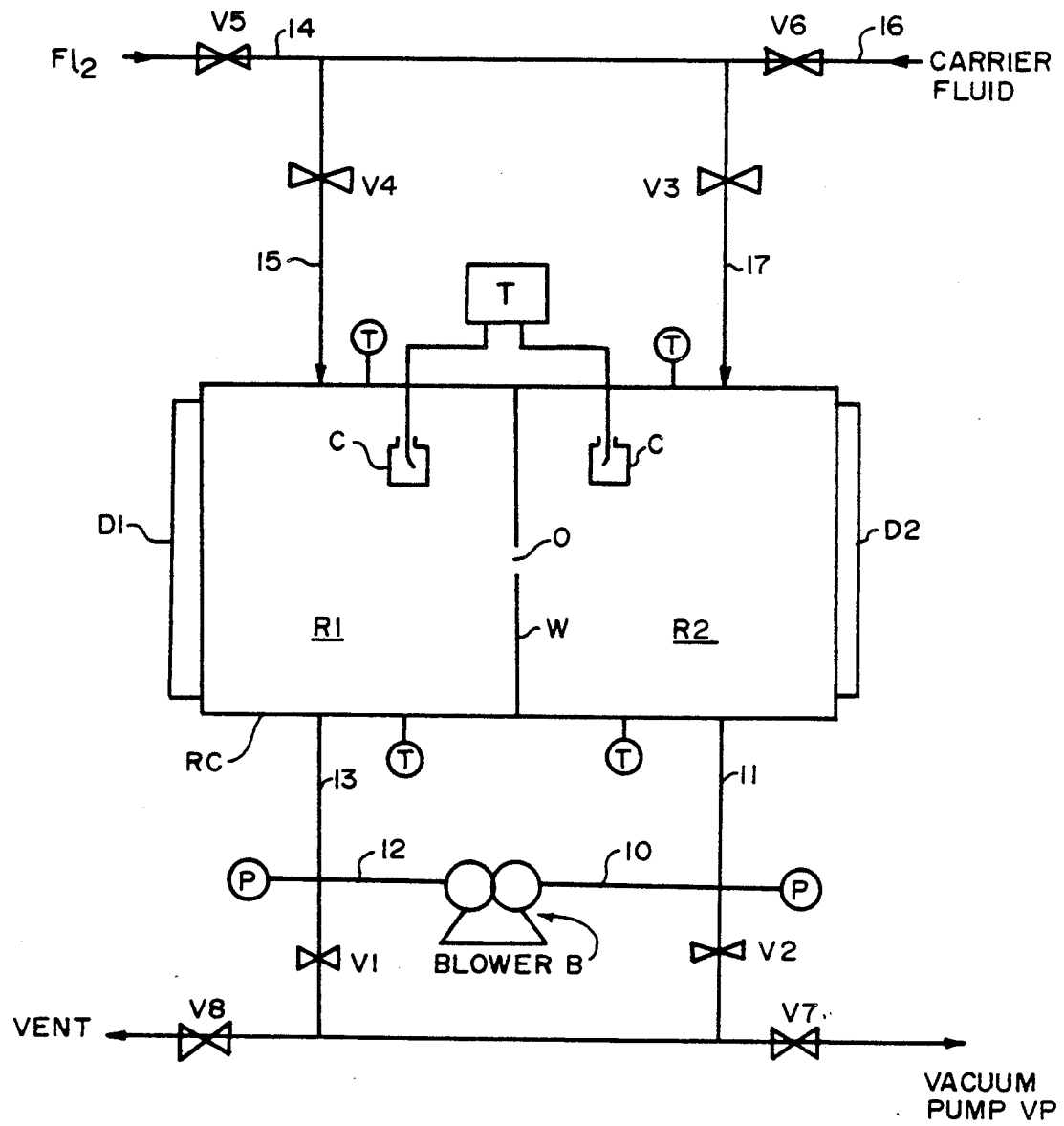
P – PRESSURE GAUGE
T – TEMPERATURE GAUGE

DIRECT FLUORINATION OF POLYMERIC MATERIALS BY USING DIOXIFLUORINE FLUID (MIXTURE OF CO₂ AND F₂)

FIELD OF THE INVENTION

The invention relates to a new carrier fluid for use in treating polymeric materials with fluorine and, more particularly, to using carbon dioxide as the improved carrier fluid.

BACKGROUND OF THE INVENTION

Since its discovery, fluorine has been known as an aggressive element. It is especially aggressive with organic compounds, such as hydrocarbons. Many scientists have shown interest in the development of techniques for direct fluorination of polymeric materials. This can be done by using a mixture of fluorine and a carrier-diluting fluid which reduces the aggressiveness of the fluorine. In the prior art, helium, He, and argon, Ar, have been used as the carrier fluid, but in commercial fluorination, nitrogen, $N_2$, is the standard carrier fluid because of its lower cost. Representative prior art patents which disclose fluorination processes and the carrier fluids used include: U.S. Pat. No. 2,811,468 to Joffre; U.S. Pat. Nos. 3,674,432, 3,711,595, and 3,775,489 to Professor Margrave et. al.; U.S. Pat. Nos. 3,998,180 and 4,081,574 to Hawkins et. al.; and U.S. Pat. No. 4,576,837 to Tarancon. He, Ar, and $N_2$ all reduce the aggressiveness of the fluorine, induce some solubility of the byproduct hydrogen fluoride HF and help carry the heat to some degree to and from the polymer. As ideal gases, they have low density (1 atm and 350K), they induce low dipole moment, and they have a low critical temperature. These three factors in these gases minimize their heat capacity per unit of volume and their solubility of the byproduct HF. Any HF which is not dissolved by the gas remains on the surface of the polymer and blocks the continuation of the fluorination reaction. The result is a decrease in the efficiency of the fluorination process.

It is therefore an object of the present invention to provide an improved carrier fluid for use in fluorination of polymeric materials, wherein the carrier fluid has a high critical temperature, a high induced dipole moment, a high density, a high heat capacity, a high solubility for hydrogen fluoride, decreases the preheating time, maintains the reaction temperature at a more uniform level, increases the rate of fluorination, and which is inexpensive and safe to use.

SUMMARY OF THE INVENTION

The fluorination process is made more efficient by use of a new mixture, $CO_2$-$F_2$, designated hereinafter as dioxifluorine fluid. This new fluid has a higher critical temperature of 31° C., a higher induced dipole moment, about double the density in the range of temperature for fluorination, a higher heat capacity per unit of volume, and a higher solubility of the byproduct hydrogen fluoride than the mixtures used in the prior art. Since less HF remains on the surface of the polymer, the efficiency of the fluorination process using dioxifluorine increases by up to 50%. Advantageously, the present invention provides an improved fluorination process by using an improved carrier fluid, carbon dioxide, with the fluorine gas.

BRIEF DESCRIPTION OF THE DRAWINGS

Further objects, features, and advantages of the present invention will become apparent upon consideration of the detailed description of the presently-preferred embodiment, when taken in conjunction with the accompanying drawing, wherein:

FIG. 1 is a diagrammatic illustration of the apparatus used to perform the process of fluorination.

DETAILED DESCRIPTION OF THE PREFERRED EMBODIMENTS OF THE INVENTION

When fluorine reacts with polymerics, including polyolefins (e.g., polyethylene), the hydrogen in the molecule of the polymeric material is replaced by fluorine. The replaced hydrogen combines with a fluorine atom to form the byproduct HF. The reaction taking place is exothermic, and in order to prevent deterioration of the product being fluorinated, the heat must be dissipated. A carrier fluid must be added to the fluorine to help dissipate the heat (or add heat, if necessary, to bring the polymer to reaction temperature). This carrier fluid also reduces the aggressiveness of the fluorine and dissolves the byproduct. The carrier fluids used in the prior art (e.g., $N_2$, Ar, He) are gases that have a low-solubility capacity for the byproduct HF which is produced because of their polarizability, low critical temperature, low density, and low heat capacity, which reduces their ability for heat transfer in both directions.

The new fluid used in this invention uses $CO_2$ as the carrier fluid. $CO_2$ is a vapor at 300° K., is triatomic with different kinds of elements, and is a polarizable molecule, as opposed to the carrier fluids used in the prior art, which are diatomic or monotomic and have only one element. The density of $CO_2$ within the temperature range of the fluorination process of polyethylene (300° K. to 400° K.) is very high in comparison to the density of $N_2$ in the same range. The heat contained in $CO_2$ per unit of volume is double the amount contained in $N_2$ per unit of volume. HF is far more soluble in $CO_2$ than in $N_2$, guaranteeing a more complete fluorination reaction. The percentage of fluorine to carbon dioxide by volume in the reaction chamber is in the range of 2% to 20% for the reaction.

Because the critical temperature of $CO_2$ is 31° C., it can be stored at room temperature in regular tank containers. The carrier fluids in the prior art required cryogenic tanks with very sensitive temperature release valves to protect the container from excessive pressure.

Referring to FIG. 1, there is shown an apparatus for carrying out a fluorination process. The apparatus includes one reaction chamber RC having two compartments $R_1$ and $R_2$ which are separated by a wall W having an opening O formed therein for the passage of gases back and forth between the compartments. Compartments $R_1$ and $R_2$ are provided with doors $D_1$ and $D_2$, respectively, for supplying the objects, such as containers C, to be treated in the compartments of the reaction chamber. The reaction chamber RC includes temperature gauges T, some of which are inserted in the containers C to be treated, as shown. Also provided is a bidirectional blower B connected by gas lines 10, 11, 12, and 13 to compartments $R_1$ and $R_2$ to move gas back and forth between compartments $R_1$ and $R_2$. Pressure gauges P are provided to measure the pressure in these lines. Reaction chamber RC may also be provided with a jacket of circulating water to preheat the chamber RC.

Fluorine gas is provided via valves $V_3$, $V_4$, and $V_5$ to reaction chamber RC, and the carrier fluid is provided via valves $V_3$, $V_4$, and $V_6$ to reaction chamber RC. Valves $V_1$, $V_2$, and $V_8$ are used for venting, and valves $V_1$, $V_2$, and $V_7$ are used for evacuating the reaction chamber RC by using vacuum pump VP.

EXPERIMENT I

An experiment was conducted, using the apparatus of FIG. 1, to determine which carrier fluid minimizes the preheating time for preheating the reaction chamber RC. The reaction chamber RC has an internal volume of 0.65 cubic meters, an inside width of 60 cm, an inside height of 90 cm, and an inside length of 150 cm. The internal walls are of Monel, and reaction chamber RC is surrounded by a jacket of circulating water for insulation purposes. The circulation blower B has a capacity of 4 cubic meters per minute.

For the experiment, containers of high-density polyethylene and white pigment were placed in reaction chamber RC. For each carrier fluid used, 600 containers were used, each having a volume of 500 ml and a weight of 40 grams, for a total weight of 24 kilograms.

EXPERIMENT PROCEDURE

1. Load the reaction chamber RC with 600 containers C, placing 300 containers in each compartment $R_1$ and $R_2$, and close the doors $D_1$ and $D_2$. Insert a glass thermometer inside one container C in order to read the surface temperature of the container, and record the initial temperature.

2. Pull a vacuum in the reactor chamber RC to 50 m bar. by using vacuum pump VP and by opening valves $V_7$, $V_1$, and $V_2$.

3. Add one of the carrier fluids (He, Ar, $N_2$, and $CO_2$) to chamber RC, and bring the pressure up to 850 m bar. by opening valves $V_3$, $V_4$, and $V_6$. The carrier fluid when added is at room temperature.

4. Circulate the carrier fluid with the blower B at a rate of 4 cubic meters per minute for at least 12 minutes.

5. After the heating period, open doors $D_1$ and $D_2$, and check the surface temperature of container C (read in the thermometer), and record the final temperature.

6. Unload the containers and start a new run for the next carrier fluid.

The results recorded are as follows:

TABLE I

| Run | Carrier Fluid | Jacket Temp. | Initial Temp. | Final Temp. | $\Delta T$ °C. | Time Min. | Time Req. | Eff % |
|---|---|---|---|---|---|---|---|---|
| 1 | He | 60° C. | 27° C. | 41 | 14 | 12 | 23 | 52 |
| 2 | Ar | 60° C. | 27° C. | 46 | 19 | 12 | 17 | 70 |
| 3 | $N_2$ | 60° C. | 27° C. | 43 | 16 | 12 | 20 | 60 |
| 4 | $CO_2$ | 60° C. | 27° C. | 54 | 27 | 12 | 12 | 100 |

As will be noted from Table I, when using $CO_2$ as the carrier fluid, a higher reaction temperature was reached per unit of time than when using any of the carrier fluids of the prior art per equal unit of time (12 minutes). In order to illustrate the findings of this experiment, it is assumed that $CO_2$ has 100% efficiency. The efficiency of the other fluids in comparison to $CO_2$ is shown in Table I, based on the time required to reach the same temperature as $CO_2$ in 12 minutes.

EXPERIMENT II

A further experiment was also performed, using the apparatus of FIG. 1, to determine which carrier fluid provided the most efficient fluorination process using the following steps:

1. Load the reactor RC with empty containers C of polymeric material through the doors $D_1$ and $D_2$.

2. Close the doors $D_1$ and $D_2$ of the reactor RC.

3. Pull a vacuum in the reactor to 50 m bar. by using vacuum pump VP and by opening valves $V_7$, $V_1$, and $V_2$ and then closing valves $V_1$, $V_2$, and $V_7$.

4. Add one of the carrier fluids (He, Ar, $N_2$, and $CO_2$) to reactor RC to preheat it with carrier fluid opening valves $V_6$, $V_3$, and $V_4$. The carrier fluid when added is at room temperature.

5. Circulate the carrier fluid with heating blower B until reactor RC reaches a predetermined temperature, such as 71° C.

6. Pull a vacuum in the reactor RC to 20 m bar. by using vacuum pump VP, opening valves $V_7$, $V_1$, and $V_2$, and then close the valves after evacuation.

7. Add fluorine at room temperature to the desired level, such as 5%, by opening valves $V_5$, $V_3$, and $V_4$, and then closing valve $V_5$. The 5% represents the proportion of fluorine to carrier fluid by volume.

8. Add carrier fluid, at room temperature, to reactor RC to 850 m bar. by opening valves $V_6$, $V_3$, $V_4$, and close them after the pressure reaches the desired level.

9. The reaction was then allowed to proceed for 30 minutes.

10. Using vacuum pump VP, pull a vacuum in the reactor RC to remove the reactor gas with the gas byproduct by opening valves $V_1$, $V_2$, and $V_7$, and then closing valve $V_7$ and opening valve $V_8$.

After the foregoing procedure was carried out, the surface of the treated containers C were analyzed by using an infrared spectrophotometer—Perkin Elmer Model 584—with an internal reflector attachment, and the following results were recorded using $CO_2$ as having 100% efficiency.

TABLE II

| Carrier Fluid | Percent of Surface Having $C_2F_4$ with Respect to Original $C_2H_4$ in Surface | Fluorination Level Efficiency |
|---|---|---|
| He | 28 | 52% |
| Ar | 36 | 68% |
| $N_2$ | 32 | 61% |
| $CO_2$ | 54 | 100% |

Carbon dioxide preheats the mass of polymer in a shorter period of time, and as the reaction takes place, it maintains the reaction environment at a relatively constant temperature due to the higher heat, capacity per unit of volume. The association of $CO_2$ with the HF byproduct induces the migration of the byproduct from the surface of the solid polymer being fluorinated to the body of the gas mixture. The equilibrium in the gas phase can be represented as (the plus and minus signs indicate the polarity of the molecule):

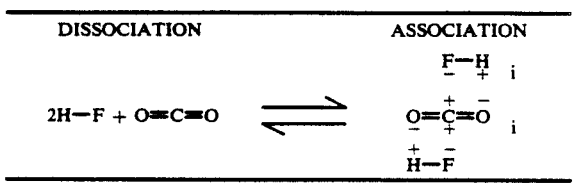

Note:
i refers to an infinitesimal charge.

The presence of byproduct HF in the reaction environment which has a high dipole moment induces polarization in the $CO_2$ molecules, and an unstable complex of HF and $CO_2$ is formed. The equilibrium is shifted to the right as the byproduct (HF) is formed. This complex formation guarantees the removal of HF from the surface of the polymer. When the complex of HF and $CO_2$ is transferred to a scrubber, the $CO_2$ is separated from the HF, and the HF reacts with solid in the scrubber to form solid fluoride.

Accordingly, the above experiments show that $CO_2$ is the best carrier fluid to use to optimize the fluorination process.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. In a gas-phase process for treating solid polymeric materials with elemental fluorine to cause a chemical reaction between the fluorine and polymeric material, wherein the polymeric material is placed in a sealed reaction chamber, and wherein fluorine is supplied to the reaction chamber, and wherein a carrier fluid is supplied to the reaction chamber, either separately or as recombined mixture with fluorine, and wherein a reaction is allowed to take place in the reaction chamber to fluorinate said polymeric materials with said mixture of fluorine and carrier fluid, the improvement comprising the step of supplying gaseous carbon dioxide to said reaction chamber as said carrier fluid so that a gaseous mixture of carbon dioxide and fluorine treats the polymeric materials, with the percentage of fluorine to carbon dioxide by volume in the reaction chamber being in the range of from 2% to 20% for the reaction.

2. The process of claim 1 further including the step of preheating the reaction chamber with carbon dioxide until the temperature level required for the reaction is reached.

3. The process of claim 1 wherein the reaction in the reaction chamber takes place in the temperature range of 300° K. to 400° K.

4. The process of claim 1 wherein the reaction time in the reaction chamber is in the range of 2 minutes to 200 minutes.

5. The process of claim 1 wherein the pressure of said mixture of fluorine and carbon dioxide in the reaction chamber during treatment is in the range of 200 m bar. to 2,000 m bar.

* * * * *